Dec. 27, 1949 W. H. CUMMINS 2,492,686
ADJUSTABLE SAW GAUGE
Filed Dec. 20, 1944 2 Sheets-Sheet 2
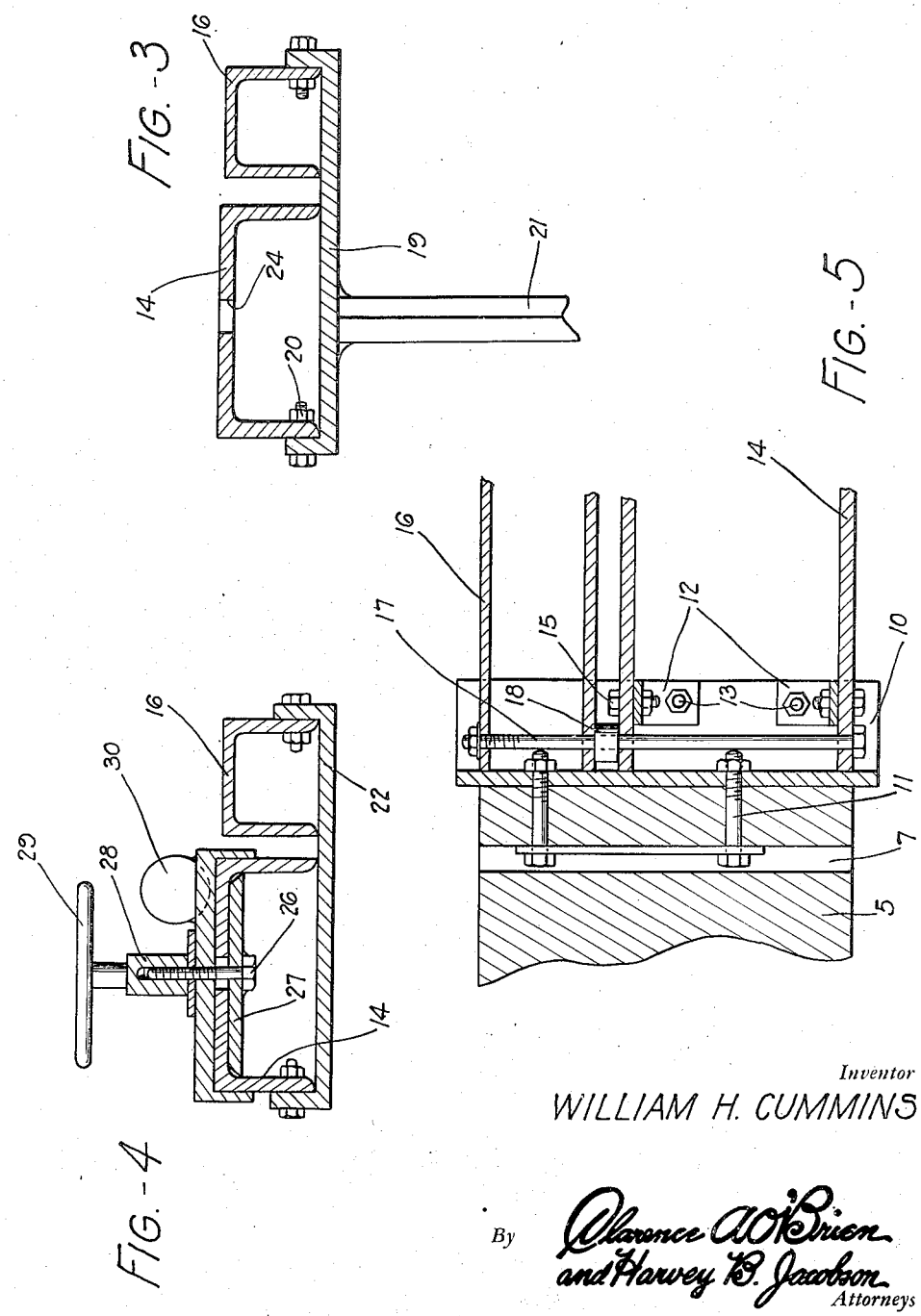
Inventor
WILLIAM H. CUMMINS Patented Dec. 27, 1949

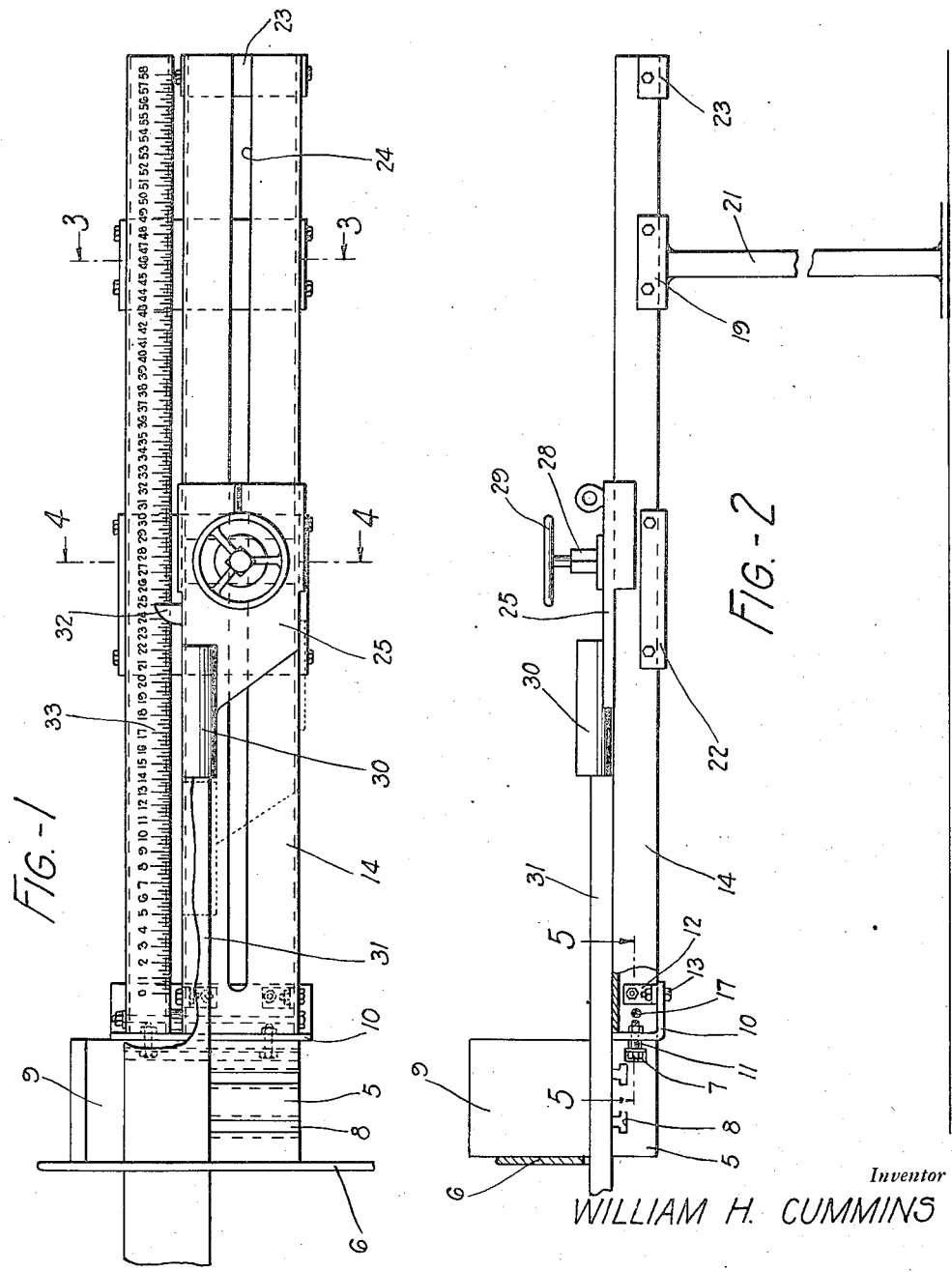

2,492,686

UNITED STATES PATENT OFFICE 2,492,686

ADJUSTABLE SAW GAUGE

William H. Cummins, Tulsa, Okla.

Application December 20, 1944, Serial No. 569,056

1 Claim. (Cl. 29—67)

The present invention relates to new and useful improvements in saw gauges adapted to accurately measure the length of the work to be cut, whereby to save time, to avoid unnecessary handling, and to prevent mistakes and waste of the material.

An important object of this invention is to provide a saw gauge designed particularly for use in connection with power-operated hack saws for sawing metal rods and bars, and embodying means for attaching the gauge to a conventional type of saw table without necessitating any changes or alterations in the construction thereof.

A further object is to provide a saw gauge attachment of this character of simple and practical construction, which is efficient and dependable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view.

Figure 2 is a side elevational view with parts broken away and shown in section.

Figures 3 and 4 are transverse sectional views taken respectively on the lines 3—3 and 4—4 of Figure 1.

Figure 5 is a fragmentary enlarged sectional view taken substantially on a line 5—5 of Figure 2.

Referring now to the drawings in detail, wherein for the purpose of illustration I have disclosed a preferred embodiment of the invention, the numeral 5 designates the saw table and the numeral 6 designates the saw operating in conjunction therewith.

The table 5 is formed with a T-slot 7 extending horizontally along its front edge and one or more T-shaped slots 8 in the surface of the table and extending outwardly through one side thereof. A saw guide or stop 9 rises from the opposite side of the table for engagement with one side of the saw 6 to guide the same in its vertical movement.

An angle iron bracket 10 is secured to the front edge of the table by means of bolts 11 engaged in the slot 7 and angle brackets 12 are secured to the horizontal flange of the bracket 10 by means of bolts 13.

An inverted channel-shaped guide 14 has its sides secured to the brackets 12 by means of bolts 15 with one end of the guide 14 resting on the bracket 10.

A second inverted channel-shaped member 16 is positioned in spaced parallel relation to the channel guide 14 with one end of the channel member 16 also resting on the bracket 10 and secured in position by means of a bolt 17 extending transversely through the sides of the channel member 14 as well as through the sides of the channel member 16. A spacing collar 18 carried by the bolt 17 maintains the channel members 14 and 16 in spaced-apart relation.

A U-shaped cross member 19 connects the outer ends of the channel members 14 and 16 by means of the bolts 20 and supports the outer ends of said channel members by means of a post or leg 21.

A U-shaped cross member 22 also connects the channel members 14 and 16 intermediate the ends thereof and the lower edges of the channeled guide 14 at its outer end is connected by a cross member 23.

The upper surface of the channel guide 14 is formed with a longitudinally extending slot 24 extending from a point adjacent its inner end through the outer end of the guide.

An inverted U-shaped slide 25 is slidably mounted on the guide 14 having a bolt 26 extending upwardly therethrough, the bolt extending downwardly through the slot 24 with its head engaging a clamping plate 27 positioned against the under side of the guide 14. A socket 28 is threaded on the upper end of the bolt 26 and has a hand wheel 29 formed therewith, whereby to clamp the slide 25 in adjusted position on the guide 14.

A longitudinally extending stop 30 projects forwardly from the slide 25 with its outer end adapted for abutment by the work 31 positioned on the saw table 5.

One edge of the slide 25 is formed with a pointer 32 overlying a scale 33 marked or otherwise carried on the upper surface of the channel member 16.

Accordingly, in the operation of the device, the slide 25 is adjusted longitudinally of the guide 14 so as to move the stop 30 into a desired position for engagement by an end of the work 31 to thus indicate the measurement of the length of the work to be cut by the saw 6.

It is believed that the details of construction and manner of use of the device will be readily understood from the foregoing without further detailed explanation.

Having thus described the invention, what is claimed is:

A saw gauge comprising a pair of inverted U- shaped members, a bracket adapted for attaching at one edge of a saw table, means for attaching one end of said members to the bracket in spaced parallel relation to each other, said members extending outwardly from said edge of the table, one of said members having a scale thereon and the other of said members having a longitudinally extending slot, a slide mounted on said last-named member, a bolt extending through the slot and adapted for clamping the slide in adjusted position on said last-named member, a pointer carried by the slide overlying the scale, a stop on the slide in the path of one end of work positioned on the table, a bracket connecting said members together at the other ends thereof in spaced parallel relation, and a leg depending from said last mentioned bracket for supporting said members outwardly of said table.

WILLIAM H. CUMMINS.

REFERENCES CITED

The following references are of record in the file of this patent:

UNITED STATES PATENTS

| Number | Name | Date |
|---|---|---|
| 296,191 | Lawlor | Apr. 1, 1884 |
| 345,071 | Palm | July 6, 1886 |
| 372,809 | Lang | Nov. 8, 1887 |
| 410,119 | Schwab | Aug. 27, 1889 |
| 1,081,764 | Meyers | Dec. 16, 1913 |
| 1,195,249 | Matthews | Aug. 22, 1916 |
| 1,938,548 | Tautz | Dec. 5, 1933 |
| 1,942,873 | Narrow | Jan. 9, 1934 |
| 1,944,524 | Parrish | Jan. 23, 1934 |